(12) United States Patent
Garrett et al.

(10) Patent No.: US 9,646,723 B2
(45) Date of Patent: May 9, 2017

(54) THERMOACOUSTIC ENHANCEMENTS FOR NUCLEAR FUEL RODS AND OTHER HIGH TEMPERATURE APPLICATIONS

(71) Applicant: The Penn State Research Foundation, University Park, PA (US)

(72) Inventors: Steven L. Garrett, State College, PA (US); James A. Smith, Idaho Falls, ID (US); Dale K. Kotter, Shelley, ID (US)

(73) Assignee: The Penn State Research Foundation, University Park, PA (US)

( * ) Notice: Subject to any disclaimer, the term of this patent is extended or adjusted under 35 U.S.C. 154(b) by 854 days.

(21) Appl. No.: 13/968,936

(22) Filed: Aug. 16, 2013

(65) Prior Publication Data

US 2014/0050293 A1 Feb. 20, 2014

Related U.S. Application Data

(60) Provisional application No. 61/683,992, filed on Aug. 16, 2012.

(51) Int. Cl.
| | | |
|---|---|---|
| *G21C 3/16* | (2006.01) | |
| *G01K 11/22* | (2006.01) | |
| *G21C 17/10* | (2006.01) | |
| *G21F 5/005* | (2006.01) | |
| *G21F 5/06* | (2006.01) | |
| *G21F 9/28* | (2006.01) | |

(52) U.S. Cl.
CPC ............... *G21C 3/16* (2013.01); *G01K 11/22* (2013.01); *G21C 17/102* (2013.01); *G21F 5/005* (2013.01); *G21F 5/06* (2013.01); *G21F 9/28* (2013.01); *Y02E 30/40* (2013.01)

(58) Field of Classification Search
CPC .... G21C 17/10; G21C 17/102; G21C 17/112; G01K 11/22; F02G 2243/52; F02G 2243/54
See application file for complete search history.

(56) References Cited

U.S. PATENT DOCUMENTS 2,836,033 A * 5/1958 Marrison ................ F03G 7/002
116/137 A
2,856,341 A * 10/1958 Kanne .................. G21C 17/102
136/202

(Continued)

FOREIGN PATENT DOCUMENTS

JP 2001076770 A 3/2001

OTHER PUBLICATIONS

ISR and Written Opinion issued Nov. 14, 2013 in corresponding PCT application Serial No. PCT/US2013/052502.

*Primary Examiner* — Jack W Keith
*Assistant Examiner* — Sharon M Davis
(74) *Attorney, Agent, or Firm* — Dinsmore & Shohl LLP

(57) ABSTRACT

A nuclear thermoacoustic device includes a housing defining an interior chamber and a portion of nuclear fuel disposed in the interior chamber. A stack is disposed in the interior chamber and has a hot end and a cold end. The stack is spaced from the portion of nuclear fuel with the hot end directed toward the portion of nuclear fuel. The stack and portion of nuclear fuel are positioned such that an acoustic standing wave is produced in the interior chamber. A frequency of the acoustic standing wave depends on a temperature in the interior chamber.

6 Claims, 8 Drawing Sheets

(56) References Cited

U.S. PATENT DOCUMENTS

| | | | | |
|---|---|---|---|---|
| 3,087,886 A | * | 4/1963 | Robinson | G01K 1/14 340/870.17 |
| 3,214,976 A | * | 11/1965 | Miller, Jr. | G01K 11/26 374/117 |
| 3,611,804 A | * | 10/1971 | Bentz | G01K 11/22 374/118 |
| 3,899,390 A | | 8/1975 | Klein et al. | |
| 4,020,693 A | | 5/1977 | Ahlgren et al. | |
| 4,126,514 A | * | 11/1978 | Wonn | G21C 17/07 376/252 |
| 4,246,784 A | | 1/1981 | Bowen | |
| 4,319,958 A | | 3/1982 | Fica et al. | |
| 4,538,464 A | * | 9/1985 | Wheatley | G01H 3/10 136/212 |
| 4,625,517 A | * | 12/1986 | Muller | F02G 1/057 60/721 |
| 6,637,211 B1 | * | 10/2003 | Swift | F25B 9/145 60/520 |
| 2006/0203877 A1 | * | 9/2006 | Heyman | G01K 11/22 374/117 |

\* cited by examiner

THERMOACOUSTIC ENHANCEMENTS FOR NUCLEAR FUEL RODS AND OTHER HIGH TEMPERATURE APPLICATIONS

CROSS REFERENCE TO RELATED APPLICATION

This application claims priority from U.S. provisional patent application Ser. No. 61/683,992, filed Aug. 16, 2012, the content of which is incorporated herein in its entirety.

STATEMENT OF GOVERNMENT SPONSORSHIP

This invention was made with government support under Grant No. DE-AC07-05ID14517, awarded by the Department of Energy. The government has certain rights in the invention.

FIELD OF THE INVENTION

The present invention relates generally to thermoacoustic devices used in combination with high temperature processes.

BACKGROUND OF THE INVENTION

Thermoacoustic devices are structures that are configured to produce acoustic waves in the presence of a temperature differential or, conversely, to produce a temperature differential in the presence of acoustic waves. The earliest recorded instance of the conversion of heat to sound is the Kibitsunokama, an instrument used in historical Japanese shrine rituals. This instrument was mentioned in a Buddhist monk's diary written in 1568, and was described in a story published in 1776. The first record in the scientific literature of the thermoacoustic generation of sound was an experiment by Byron Higgins, in 1777, in which acoustic oscillations in a large pipe were excited by suitable placement of a hydrogen flame inside the pipe.

The Rijke tube, an early extension of Higgins' work, is well known to modern acousticians as a dramatic lecture demonstration. Higgins' research eventually evolved into the modern science of pulse combustion, whose applications included the German V-1 rocket (the "buzz bomb") used in World War II and the residential pulse-combustion furnace introduced by Lennox, Inc. in 1982.

The Sondhauss tube is the earliest thermoacoustic engine that is a direct antecedent of a thermoacoustic engine of the type used in the present invention. Nearly two hundred years ago, glassblowers noticed that when a hot glass bulb was attached to a cool glass tubular stem, the stem tip sometimes emitted sound. Sondhauss quantitatively investigated the relation between the pitch of the sound and the dimensions of the apparatus.

John W. Strutt (Lord Rayleigh) was the first to provide a qualitative explanation of the process that converted heat to sound in the Sondhauss tube in 1896:

"If heat be given to the air at the moment of greatest condensation, or be taken from it at the moment of greatest rarefaction, the vibration is encouraged."

Although Rayleigh's qualitative understanding was correct, it was not until nearly a century later that Nikolas Rott published a series of papers which created a detailed theoretical framework that could produce a unified quantitative description of thermoacoustic phenomena and explicitly calculate the behavior of the Sondhauss tube or Taconis tube.

The efficient production of standing sound waves in sealed resonators by thermoacoustic processes started development at the Los Alamos National Laboratory in the early 1980s. By 1988, the field of thermoacoustic energy conversion had advanced to the point where experimentalists were contemplating thermoacoustic engine designs that could be competitive with other traditional heat engine technologies. One of the best-documented standing-wave thermoacoustic engines was described by G. W. Swift.

A standing-wave thermoacoustic engine of the type fabricated and analyzed by G. W. Swift in 1992 includes a porous medium, known as the "stack", along which the heat flows from a electrically-heated hot heat exchanger to a water-cooled (exhaust) cold heat exchanger. The "thermal core" (i.e., the stack and the two heat exchangers) is contained within a rigid-walled cylindrical pressure vessel that acts as the standing-wave acoustic resonator oscillating in its fundamental plane-wave mode (i.e., the resonator's length is approximately one-half of the acoustic wavelength). The hot end of the resonator is surrounded by thermal insulation and the ambient-temperature end is connected to a variable flow resistor (i.e., needle valve) and a tank that forms an adjustable acoustic load on the engine.

SUMMARY OF THE INVENTION

The present invention provides various embodiments of thermoacoustic devices for use with high temperature processes, such as self-powered monitoring of a nuclear fuel-rod. A thermoacoustic device may be integral with a nuclear fuel-rod or a separate device with a nuclear heat source, such as a fuel pellet or an absorber of high energy particles or electromagnetic radiation (i.e. a gamma absorber).

Further embodiments of the present invention are well suited to use in high temperature industrial processes such as the melt-processing of glass or metal and other processes or systems in which high temperatures are used.

A first embodiment of the present invention provides a system for high temperature materials, including a thermoacoustic sensing device. The system includes a high temperature container for holding a high temperature material, with the container having a containment wall. A thermoacoustic device is responsive to a temperature in the container. The device includes a housing defining an interior chamber. The housing has a high temperature end and a low temperature end. The housing is at least partially disposed in the high temperature container such that the high temperature end is in thermal communication with the high temperature material. The housing is configured such that an acoustic standing wave is produced in the interior chamber of the housing when there is at least a sufficient temperature differential between the high and low temperature ends of the housing. The frequency of the acoustic standing wave depends on an effective temperature in the interior chamber.

In certain embodiments, the system further includes a stack having a hot end and a cold end. The stack is disposed in the interior chamber between the high and low temperature ends of the housing and is positioned such that the acoustic wave is produced in the interior chamber when there is at least a critical temperature gradient in the stack.

In certain embodiments, the high temperature container is a nuclear container and the high temperature material is nuclear fuel disposed in fuel rods. A coolant is disposed in the nuclear container and surrounds the fuel rods. The thermoacoustic device has a nuclear heat source disposed in the interior chamber at the high temperature end of the housing and spaced from the hot end of the stack. In some versions, the nuclear heat source is a portion of nuclear fuel. In other versions, the nuclear heat source is a high energy absorber operable to absorb high energy radiation from the nuclear fuel and the fuel rods. In some versions, the housing of the thermoacoustic device is completely disposed in the coolant in the nuclear container.

In certain embodiments, the high temperature container is a nuclear container and the system further includes fuel rod housings disposed in the nuclear container. The high temperature material is nuclear fuel disposed in the fuel rod housings and a coolant is disposed in the nuclear container and surrounds the fuel rod housings. One of the nuclear fuel rod housings further defines the housing of the thermoacoustic device and at least a portion of the nuclear fuel in the nuclear fuel rod is spaced from the hot end of the stack. Some versions include a second thermoacoustic device and one of the nuclear fuel rod housings further defines the housing for the second thermoacoustic device. The housing has an interior chamber. The second thermoacoustic device has a stack disposed in the interior chamber and a nuclear heat source spaced from the stack of the second thermoacoustic device. The nuclear heat source of the second thermoacoustic device may be a further portion of nuclear fuel in one of the nuclear fuel rod housings or, alternatively, the nuclear heat source of the second thermoacoustic device may be a high energy absorber.

Certain embodiments of a system in accordance with the present invention may further include a second thermoacoustic device responsive to a temperature in the container, with this device including a housing defining an interior chamber, the housing being at least partially disposed in the nuclear container such that the high temperature end is in thermal communication with the nuclear fuel. The second thermoacoustic device has a stack with a hot end and a cold end, and the stack is disposed in the interior chamber between the high and low temperature ends of the housing and positioned such that an acoustic wave is produced in the interior chamber when there is at least a critical temperature gradient in the stack. A nuclear heat source is disposed in the interior chamber at the high temperature end of the housing and is spaced from the hot end of the stack. The nuclear heat source in one of the thermoacoustic devices is a portion of the nuclear fuel and the nuclear heat source of the other of the thermoacoustic devices is a high energy absorber.

In certain embodiments of the present invention, the high temperature material is an at least partially liquefied material, and this material may be metal or glass.

In certain embodiments in the present invention, the housing of the thermoacoustic device is at least partially disposed in the containment wall such that the high temperature end is in thermal communication with the high temperature material and the low temperature end is in thermal communication with an environment external to the container.

In some version of the present invention, the housing of the thermoacoustic device is closed on the high temperature end and open to the environment on the low temperature end.

In certain embodiments of the present invention, the thermoacoustic device lacks heat exchangers.

In accordance with a further aspect of the present invention, a method is provided for monitoring the temperature of high temperature process. The method comprises providing a thermoacoustic device, wherein the device includes a housing defining an interior chamber. The housing has a high temperature end and a low temperature end. The housing is configured such that an acoustic wave is produced in the interior chamber of the housing when there is at least a sufficient temperature differential between the high and low temperature ends of the housing. A frequency of the acoustic standing wave depends on an effective temperature in the interior chamber. The housing of the thermoacoustic device is at least partially disposed in a high temperature container in which the high temperature process occurs. The high temperature end of the housing is in thermal communication with the high temperature process. The frequency of the acoustic standing wave is monitored.

In certain embodiments of the method, the thermoacoustic device further includes a stack having a hot end and a cold end. The stack is disposed in the interior chamber between the high and low temperature ends of the housing and positioned such that the acoustic wave is produced in the interior chamber when there is at least a critical temperature gradient in the stack. A nuclear heat source is disposed in the interior chamber at the high temperature end of the housing and is spaced from the hot end of the stack.

In accordance with a further embodiment of the present invention, a nuclear thermoacoustic device includes a housing defining an interior chamber and a portion of nuclear fuel disposed in the interior chamber of the housing. A stack has a hot end and a cold end and is disposed in the interior chamber of the housing and spaced from the portion of nuclear fuel with the hot end directed toward the portion of nuclear fuel. The stack and portion of nuclear fuel are positioned such that an acoustic standing wave is produced in the interior chamber when there is at least a critical temperature gradient in the stack. A frequency of the acoustic standing wave depends on an effective temperature in the interior chamber. The device may be a fuel rod and the housing may be a fuel rod housing. The frequency of the acoustic standing wave may further depend on the molecular mass of the gas mixture in the interior chamber, with the gas mixture changing as the fission products of the nuclear fuel are evolved. The stack may be a ceramic element with an array of parallel channels. In some embodiments, the thermoacoustic device lacks heat exchangers.

In accordance with yet a further embodiment of the present invention, a nuclear fuel rod with the thermoacoustic device includes a housing having a resonance chamber defined therein and a nuclear heat source disposed in the housing. The device is configured such that an acoustic standing wave is produced in the interior chamber when there is at least a sufficient temperature differential between the high and low temperature ends of the housing. In some versions, a thermoacoustic stack is disposed in the housing. The nuclear heat source may be a portion of the nuclear fuel disposed in the housing. In some versions, the thermoacoustic device lacks heat exchangers.

DETAILED DESCRIPTION OF THE INVENTION

The present invention provides various embodiments of thermoacoustic devices for use with high temperature processes, such as self-powered monitoring of a nuclear fuel-rod, system or process. A thermoacoustic device may be integral with a nuclear fuel-rod or a separate device with a nuclear heat source, such as a fuel pellet or an absorber of high energy radiation (i.e. a gamma absorber). Various non-limiting examples of devices in accordance with the present invention will be discussed herein.

Figure 1:
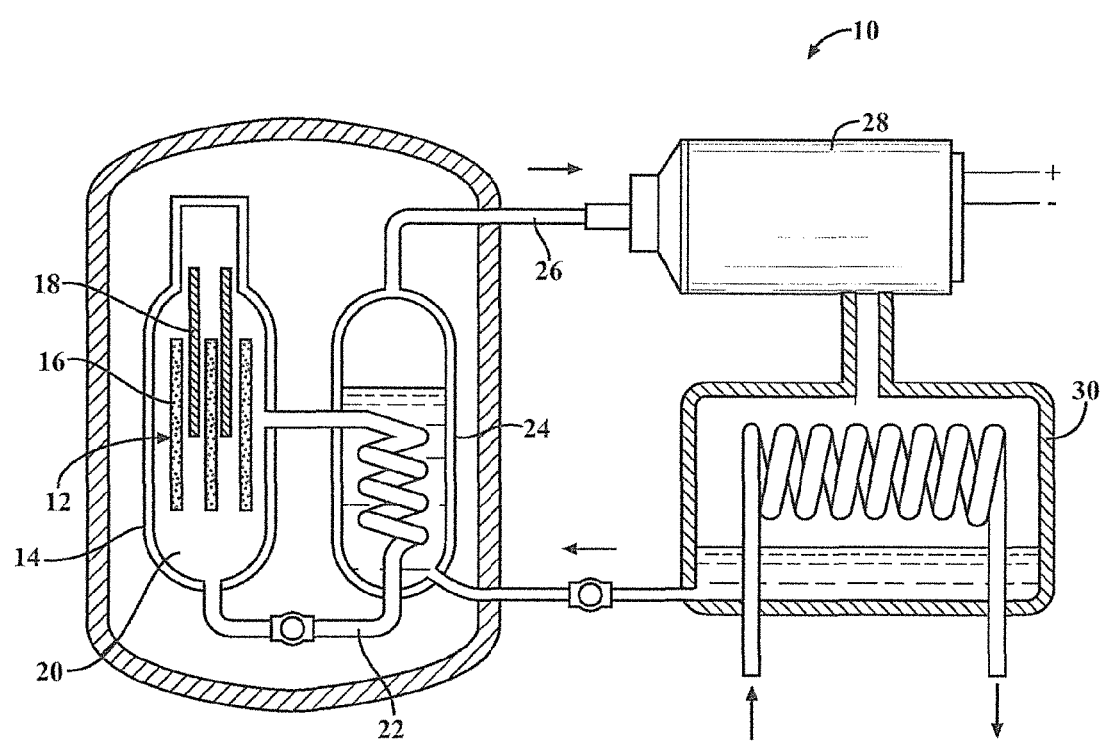
FIG. 1 is a schematic of a nuclear power system, which may utilize certain embodiments of the present invention.

FIG. 1 provides a schematic view of a generic nuclear power system, to assist in explaining how certain embodiments of the present invention may be utilized. The system 10 includes a reactor core 12 housed in a nuclear container 14. The core includes a plurality of nuclear fuel rods 16 and control rods 18. A coolant of some type fills the inside 20 of the nuclear container 14 for extracting heat from the nuclear fuel rods 16. In some reactors, the coolant is liquid water, typically under high pressure, while in other reactors coolants such as liquid sodium are used. The coolant circulates through a primary loop 22 into a heat exchanger 24. In this example, water fills the heat exchanger 24 and the heat from the primary loop 22 turns the water to steam, which is guided through a secondary loop 26. The steam drives a steam turbine and electric generator 28, thereby producing electrical power. In this example, the secondary loop continues into a secondary heat exchanger 30 where heat is extracted from the steam, returning it to the liquid state.

As known to those of skill in the art, nuclear power systems may take a wide variety of forms. The version discussed above is not limiting on the present invention.

Figure 2:
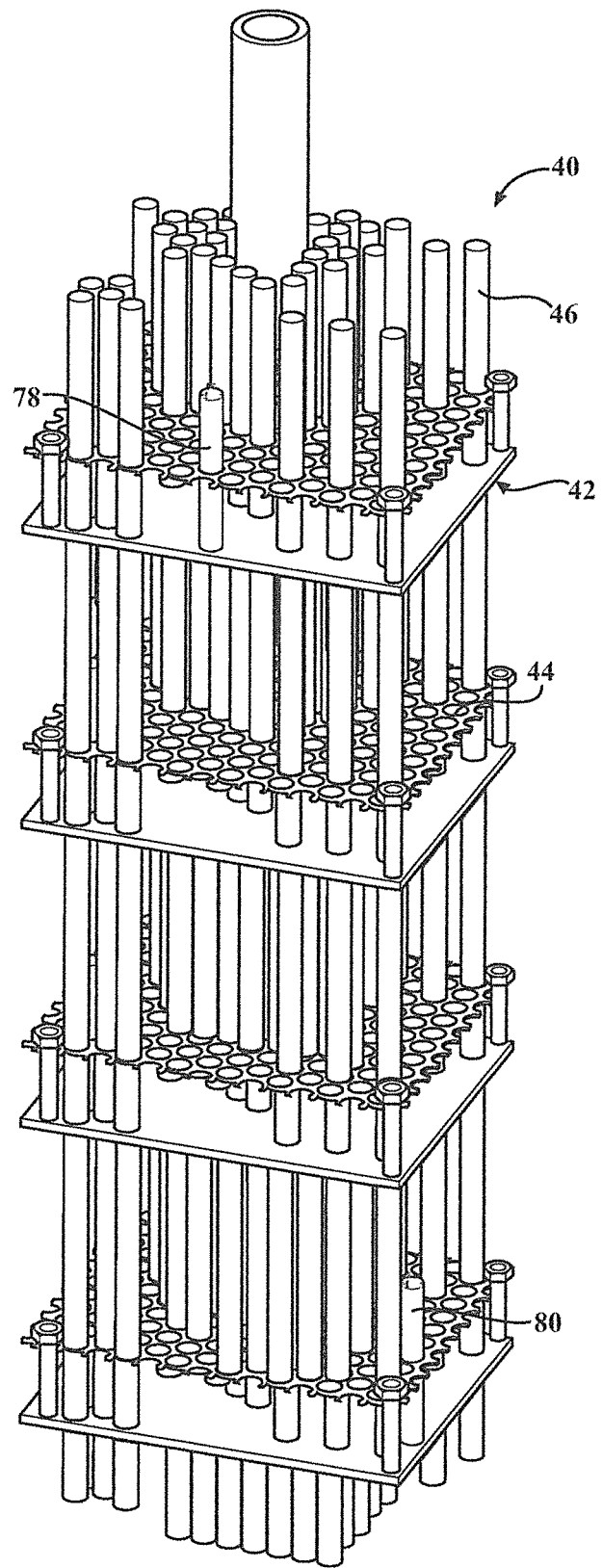
FIG. 2 is a perspective view of an exemplary nuclear fuel rod cluster including thermoacoustic devices in accordance with certain embodiments of the present invention.

The nuclear fuel in a nuclear power system typically is housed in nuclear fuel rods, which are supported in a fuel rod cluster. FIG. 2 is a perspective view of an exemplary nuclear fuel rod cluster that may be used with or form part of certain embodiments of the present invention. The fuel rod cluster 40 includes a support structure 42, which in this example includes multiple support grids 44, each with multiple openings for receiving fuel rods 46. The support grids 44 support the rods 46 in a generally parallel arrangement, with the rods spaced apart to allow coolant to circulate around the rods. The number of fuel rods 46 in the support structure 42 may be changed depending on the desired performance of the nuclear power system. The cluster 40 is merely an example of an approach to supporting nuclear fuel rods.

Figure 3:
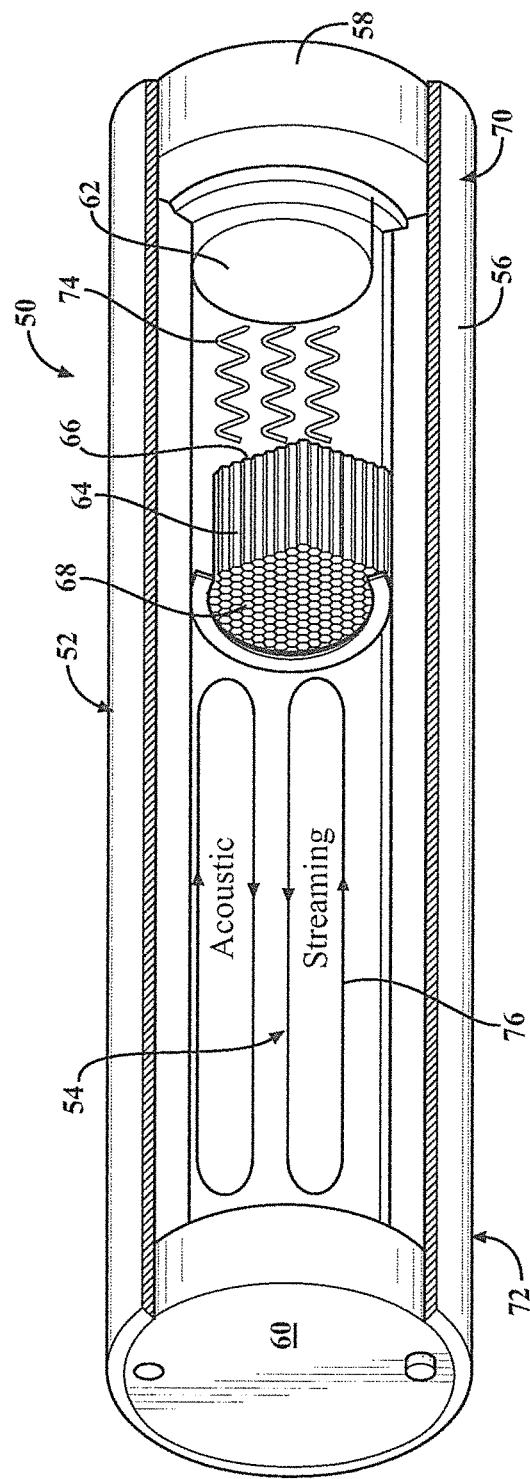
FIG. 3 is a perspective view of a partially cut away thermoacoustic device in accordance with certain embodiments of the present invention.

Referring now to FIG. 3, an embodiment of a thermoacoustic device is shown at 50. The device 50 includes a housing 52 defining an interior chamber 54, which acts as an acoustic resonator. In this version, the housing 52 is generally cylindrical with a cylindrical side wall 56 extending between two end walls 58 and 60. A nuclear heat source 62 is disposed in the interior chamber adjacent the end wall 58. A stack 64 is disposed in the interior chamber and is spaced from the nuclear heat source 62. The nuclear heat source heats the proximal end of the stack, which may be referred to as a hot end 66. The distal end 68 of the stack 64 may be referred to as a cold end, though the terms "hot" and "cold" are merely intended to reflect the relative temperatures of the two ends of the stack. The "cold" end may be at a temperature well above ambient, but lower than the "hot" end during operation of the thermoacoustic device.

The housing 52 may be said to have a high temperature end 70 and a low temperature end 72, with the nuclear heat source 62 being disposed in the interior chamber at the high temperature end. The nuclear heat source 62 heats the hot end 68 of the stack as well as the surrounding portions of the housing 52. In operation, the housing 52 is immersed in a coolant such that heat is removed from the outer surface of the housing 52. Both the high temperature end 70 and low temperature end 72 are exposed to the coolant, but the high temperature end of the housing will be at a higher temperature than the low temperature end due to the heating from the nuclear heat source 62. If desired, the high temperature end 70 may be at least partially insulated from the surrounding coolant, to further increase the temperature of the high temperature end 70.

The cold end 68 of the stack 64 will be at a lower temperature than the hot end 66 as heat flows out of the low temperature end 72 of the housing 52. Because of the temperature gradient across the stack 64, heat flows through the stack from the hot end to the cold end. The stack 64 is a porous thermoacoustic element that converts a portion of this heat flow or temperature gradient into an acoustic standing wave within the resonator defined by the interior chamber 54. The stack may take a variety forms. In the illustrated embodiment, the stack is a ceramic element that has a regular array of parallel channels. The channels may have a round or square cross-section, or other shapes. Other stack types include a metal spiral, metal foam, metal felt, ceramic or carbon foam, or honeycomb structure. The temperature gradient developed across the stack will convert some of the heat flow to a high-amplitude standing wave within the resonator. As known to those of skill in the art, the conversion of the heat flow to an acoustic standing wave occurs when there is a temperature gradient along the stack that exceeds the critical temperature gradient in the stack. Put another way, the acoustic standing wave is created when there is at least a critical temperature gradient in the stack. This may also be expressed as a sufficient temperature differential between the hot and cold ends of the stack. A sufficient temperature differential is one that is sufficient to cause the conversion of at least a portion of the heat flow to an acoustic standing wave.

In typical thermoacoustic devices or engines, a heat exchanger is provided at each end of the stack. As shown, the thermoacoustic device 50 does not have a heat exchanger at either end. Further explanation of this will be provided below. Alternative embodiments could be provided with one or more heat exchangers, but preferred embodiments lack such exchangers.

In some versions, the nuclear heat source 62 is a fuel pellet that provides heat by radioactive decay or nuclear fission. This version is a nuclear fuel rod, though the amount of fuel in the illustrated embodiment is significantly less than in a typical fuel rod. The stack converts a small fraction of the heat flux into a high-amplitude acoustic standing wave. Electromagnetic radiation from the fuel pellet 62 is represented by waves at 74. The electromagnetic radiation 74 heats the hot end 66 of the stack 64, and a portion of the resulting heat flux through the stack is converted to an acoustic standing wave. As will be explained in more detail below, the frequency of the acoustic standing wave will depend on a number of factors. First, the frequency will change with the temperature inside the chamber 54. This is because the speed of sound varies with temperature. However, the temperature in the chamber is not uniform, with some areas being much hotter than others. As such, the speed of sound is also not uniform. For simplicity, the temperature in the chamber will be referred to as an effective temperature, with the effective temperature being the temperature at which a same-sized idealized resonator would produce the same frequency. As will be clear to those of skill in the art, the effective temperature may be calculated as an integrated or weighted average of the temperature in the chamber. Calculations and experimental results show that the frequency of the acoustic standing wave increases with the effective temperature in the chamber, allowing the frequency to be used to determine the temperature.

The frequency of the standing acoustic wave will also depend on the mean molecular mass of the gas mixture in the interior chamber 54, as will be explained in more detail below. As the nuclear fuel pellet 62 decays, fission products are evolved and these fission products will alter the gas mixture and the resulting mean molecular mass of the gas mixture. Experiments show that the frequency of the acoustic standing wave is directly correlated to the ration of the square root of the polytropic coefficient, $\gamma=c_P/c_V$, to the mean molecular mass, M, of the gas. As such, the frequency may be used to provide information about the gas mixture.

The high-amplitude acoustic standing wave in the chamber 54 produces a gas pumping effect, referred to as acoustic streaming, generally represented by the gas circulation streamlines 76. This acoustic streaming provides convective heat transfer from the cold end 68 of the stack 64 to the walls of the housing 52, which are cooled by the coolant surrounding the housing. Unlike with a typical thermoacoustic engine, an ambient-temperature (exhaust) heat exchanger is not required at the cold end of the stack. The acoustic streaming actually increases the heat transfer from the nuclear fuel to the surrounding coolant, as compared to a fuel rod without the thermoacoustic elements.

This embodiment of the present invention exploits the standing sound wave to both enhance the heat transfer through the fuel-rod to the surrounding coolant or heat transfer fluid and to provide information about the physical status of the fuel-rod's interior that may include the temperature of the gas contained within the fuel-rod, the condition of the fuel pellets (e.g., the extent of crack formation), and the rate of production of radioactive decay products (e.g., krypton or xenon gas). Since this information is "encoded" by the frequency and/or amplitude of the sound produced within the fuel-rod by the thermoacoustic heat engine, that information can be transmitted by sound radiated from the fuel-rod and transmitted through the surrounding heat transfer fluid.

Such "acoustic telemetry" can be particularly useful when there is a reactor incident or accident that is accompanied by the interruption of electrical service required to power a conventional sensor (e.g., thermocouple, thermistor) or provide the electronic telemetry link to the reactor's operators. Information about the fuel-rod's status (e.g., temperature) could be obtained by reception of the sound, therefore being entirely independent of electrical service, since the sound is generated directly from the heat produced by the nuclear fuel. The acoustic signal may be picked up by a remote microphone or hydrophone, or by an operator listening to the signal from within the coolant, or by a geophone or accelerometer attached to an exterior surface of the containment vessel 14.

In an alternative embodiment of the present invention, the nuclear heat source 62 is a high energy radiation absorber, such as a gamma absorber. FIG. 3 may also represent this embodiment, with the high energy radiation absorber being represented at 62. In this embodiment, the thermoacoustic device 50 is disposed in a nuclear system close enough to nuclear fuel to be exposed to high energy radiation. The radiation is absorbed by the absorber 62, causing the temperature of the absorber to rise. The hot absorber then heats the hot end 66 of the stack by radiant, convective and/or conductive heating. The device 50 otherwise operates as previously described. However, unlike in the embodiment with nuclear fuel as the heat source, the high energy radiation absorber does not evolve fission gases, and therefore the mean molecular mass of the gas mixture in the chamber does not change. As such, changes in frequency of the acoustic standing wave are attributable to changes in temperature and not to changes in molecular mass of the gas mixture or changes in the nuclear fuel.

In one embodiment of the present invention, two or more thermoacoustic devices are disposed in a nuclear system with some of the devices having a portion of nuclear fuel (such as a fuel pellet) as the nuclear heat source and some having a high energy absorber as the heat source. The two types of thermoacoustic devices will react differently over time. The temperature of the high energy absorber will depend on the quantity of high energy radiation emitted by the nuclear fuel in proximity to the absorber, which will be the fuel in surrounding fuel rods. The acoustic frequency of this device will depend on the absorber temperature and the temperature of the coolant around the housing. The device with nuclear fuel as a heat source will produce an acoustic wave whose frequency depends on the condition of the nuclear fuel contained therein, including the mean molecular mass of the gas mixture and the cracking of the fuel, and the temperature in the chamber, which is a product of the radiative heating of the stack and the temperature of the coolant.

Referring again to FIG. 2, a first thermoacoustic device is shown at 78 and a second thermoacoustic device is shown at 80. These devices may have different types of nuclear heat sources so as to provide different types of information.

Figure 4:
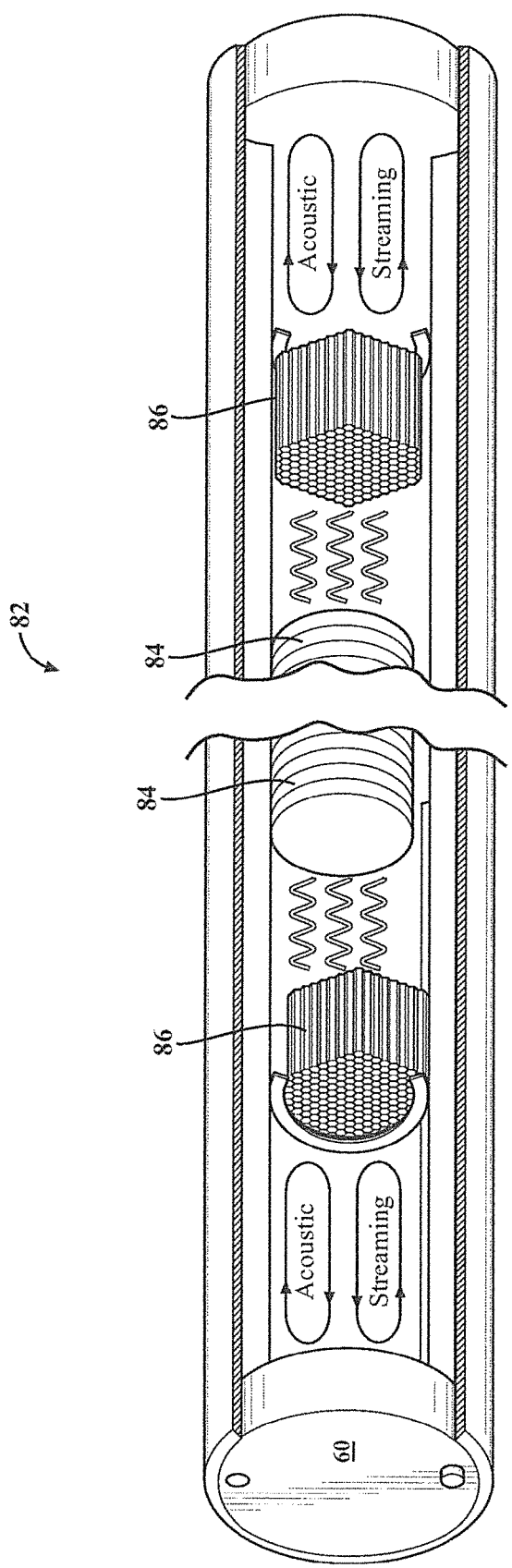
FIG. 4 is a perspective view of a partially cut away fuel rod with two thermocoustic devices in accordance with certain embodiments of the present invention.

Referring now to FIG. 4, a further embodiment of a fuel rod is shown at 82. As shown in FIG. 2, a typical fuel rod is an elongated cylinder. Some may have a length of approximately twelve feet, though other lengths are used. As known to those of skill in the art, such rods include portions of nuclear fuel and space for fission gas products. They may also include structures for positioning or applying force to the fuel. FIG. 4 illustrates the end portions of a rod 82, each of which includes a thermoacoustic device as discussed previously. As shown, a portion of nuclear fuel 84 is present in the end portions and stacks 86 are disposed outboard of the fuel 84. Alternatively, thermoacoustic devices may be provided in other locations in a fuel rod. As a further alternative, one end of the fuel rod may be sealed off from the fuel and a thermoacoustic device may be provided in this area with a high energy radiation absorber as the heat source. This provides a fuel rod with both types of thermoacoustic device discussed above, one with nuclear fuel as the heat source and one with a high energy absorber as the heat source.

Embodiments of the present invention are also useful in various high temperature processes and systems. For example, glass and metal are processed at high temperatures, and the temperatures often require careful and accurate monitoring. Embodiments of the present invention include high temperature systems and processes with a thermoacoustic device responsive to temperature in the system or process. Exemplary systems will be described, but other systems will be clear to those of skill in the art.

Figure 5:
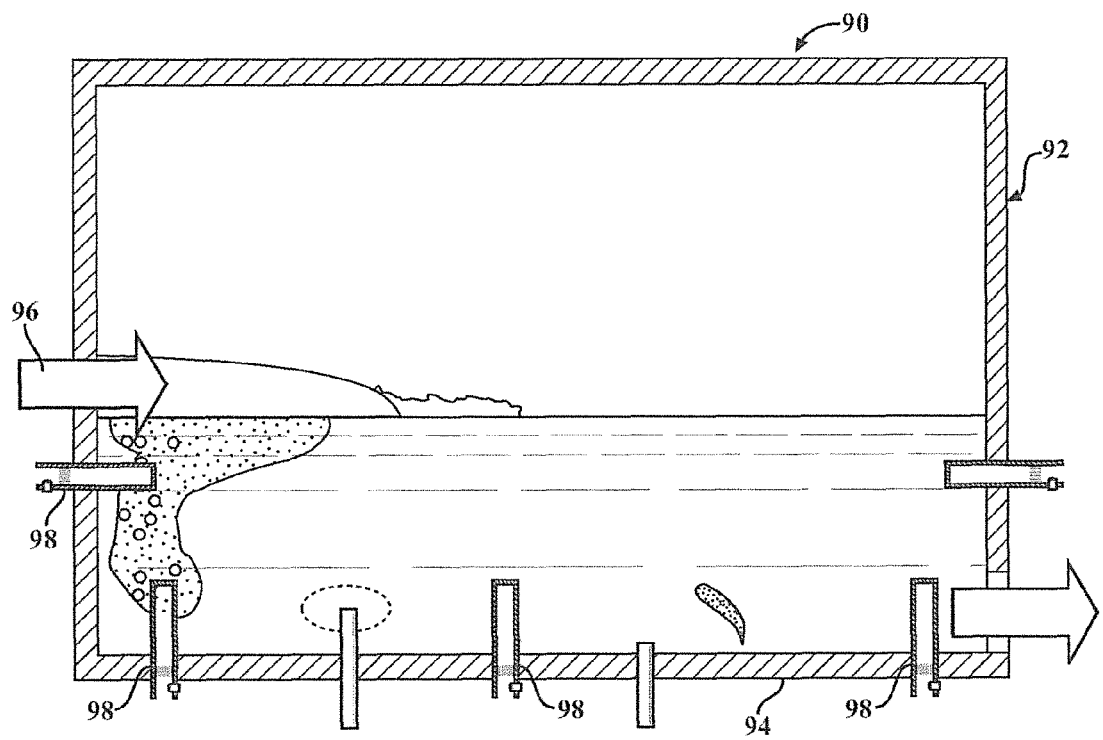
FIG. 5 is a schematic of a portion of a glass melt system including thermoacoustic devices in accordance with further embodiments of the present invention.

FIG. 5 is a schematic of a portion of a glass melt system including thermoacoustic devices. The glass melt system 90 includes a high temperature container 92 for containing the melted or melting glass. The container 92 has a containment wall 94 defining the bottom, sides and top of the container 92. Glass, as the high temperature material, is shown in the bottom of the container 92. As known to those of skill in the art, the glass may go through different areas of the melt system and may be circulated in various ways. In FIG. 5, an inlet is shown at 96, with raw materials being added through this inlet. The glass may be heated in various ways, such as heating of the container, heating elements within the glass, combustion of gas above the glass and other methods known to those of skill in the art. Typically, thermocouples are used for monitoring the temperature in the container, but the thermocouples require electrical leads that penetrate the wall 94 of the container 92 and may become unreliable. The effort of replacing a thermocouple or fixing the electrical leads is expensive and is impossible to do while the melter is operating.

Figure 6:
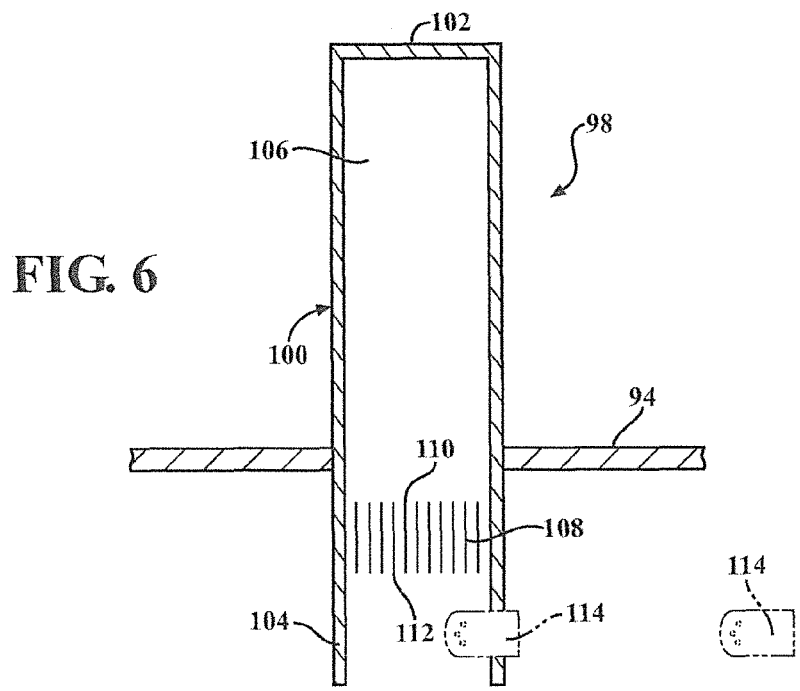
FIG. 6 is a cross sectional schematic of a thermoacoustic device in accordance with a further embodiment of the present invention.

In accordance with the present invention, one or more thermoacoustic devices are provided and are responsive to a temperature in the container 92. A plurality of such thermoacoustic devices are indicated at 98. FIG. 6 provides a cross sectional schematic of one thermoacoustic device 98, installed such that it extends through the wall 94. The thermoacoustic device includes a housing 100 having a high temperature end 102 and a low temperature end 104. The housing is at least partially disposed in thermal communication with the high temperature material, which is molten glass in this example. In this embodiment, the housing 100 penetrates the containment wall 94 so that the high temperature end 102 is in the glass melt, thereby providing direct thermal contact. The housing 100 has an interior chamber 106 defined therein. A stack 108 is disposed in the interior chamber 106 and is spaced from the high temperature end 102 of the housing 100. The stack has a hot end 110 directed toward the high temperature end 102 of the housing 100 and a cold end 112 directed toward the low temperature end 104. The stack may take a variety of forms, as discussed before.

In the illustrated embodiment, the low temperature end 104 of the housing 102 is open to the ambient environment outside the high temperature container 92. The housing may be generally cylindrical. Alternatively, other shapes may be used, and the low temperature end may be closed rather than open.

In the embodiment with the open low temperature end 104, the housing 100 is disposed in the containment wall 104 such that approximately two-thirds of the housing is in thermal contact with the glass and approximately one-third is external to the container 92. As discussed with earlier embodiments, the temperature gradient across the stack 108 is partially converted to a high amplitude standing acoustic wave. In this version, the housing has a length equal to three-quarters of a wavelength of the acoustic wave, and the stack is positioned just outboard of the containment wall 94. In operation, the thermoacoustic device 98 produces an acoustic standing wave when there is a sufficient temperature differential between the hot and colds ends of the stack, creating at least a critical temperature gradient in the stack. The frequency of the standing wave varies with the integrated average temperature in the chamber 106. This acoustic wave may be heard in the open air around the container and may be picked up by a microphone 114 near the device 98, such as positioned in the side of the housing 100 near the low temperature end 104 or at a remote location, as shown in phantom lines representing alternative locations. In this way, no electrical wiring need penetrate the container 92.

As with the earlier embodiment, the thermoacoustic device 98 does not have a heat exchanger at either end. Alternative embodiments could be provided with one or more heat exchangers, but preferred embodiments lack such exchangers.

Figure 7:
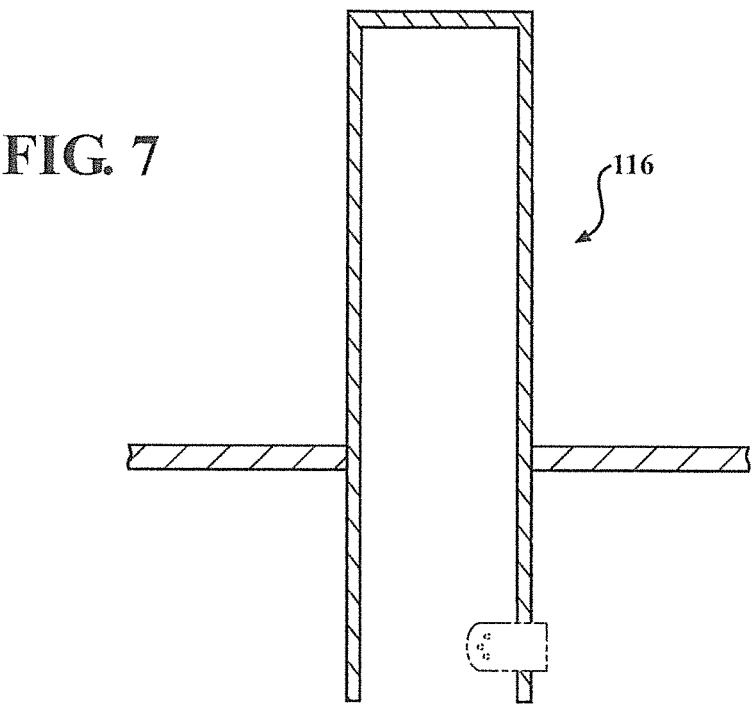
FIG. 7 is a cross sectional schematic of an alternative stackless thermoacoustic device in accordance with an alternative embodiment of the present invention.

FIG. 7 shows an alternative "stackless" thermoacoustic device 116. It is similar to the device 98 in FIG. 6, but operates without a stack. As known to those of skill in the art, such a stackless thermoacoustic device may be known as a Sondhauss tube or Taconis device. Such a thermoacoustic device will create a standing acoustic wave when there is a sufficient temperature differential between the ends of the housing. Such a stackless thermoacoustic device may be used in any embodiment of the present invention, though versions with stacks are generally preferred as having improved efficiency.

Figure 8:
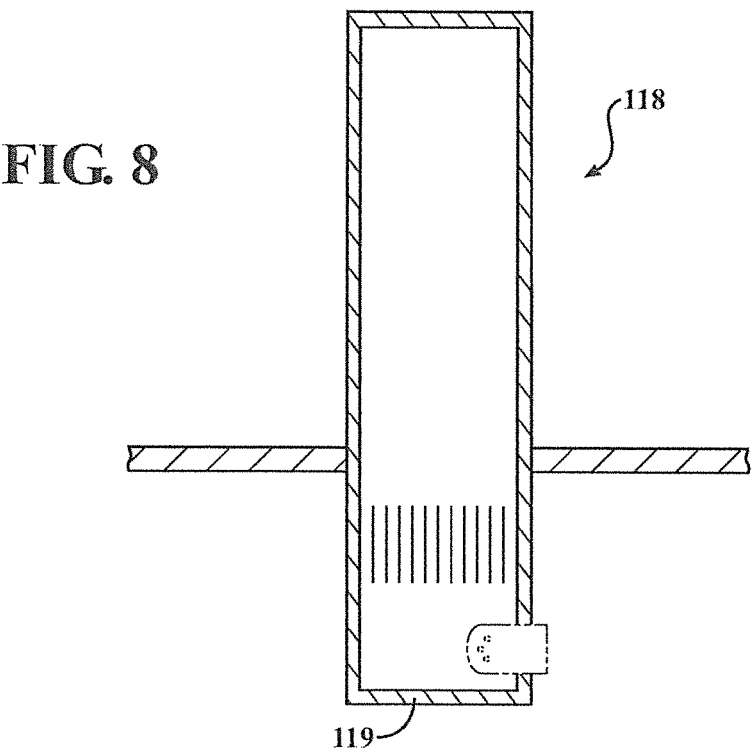
FIG. 8 is a cross sectional schematic of a further alternative thermoacoustic device with a closed outer end, in accordance with a further alternative embodiment of the present invention.

FIG. 8 shows a further alternative thermoacoustic device 118, which is similar to the device 98 in FIG. 6, but has a closed end 119 at the low temperature end of the housing. For some embodiments of the present invention, an open low temperature end is preferred, as it allows increased exposure to the temperature in the surrounding environment. However, a close ended housing may be substituted for a open ended housing in any embodiment herein, and vice versa. It should also be noted that, while the thermoacoustic devices are illustrated herein as generally cylindrical, the housings may be any shape.

Figure 9:
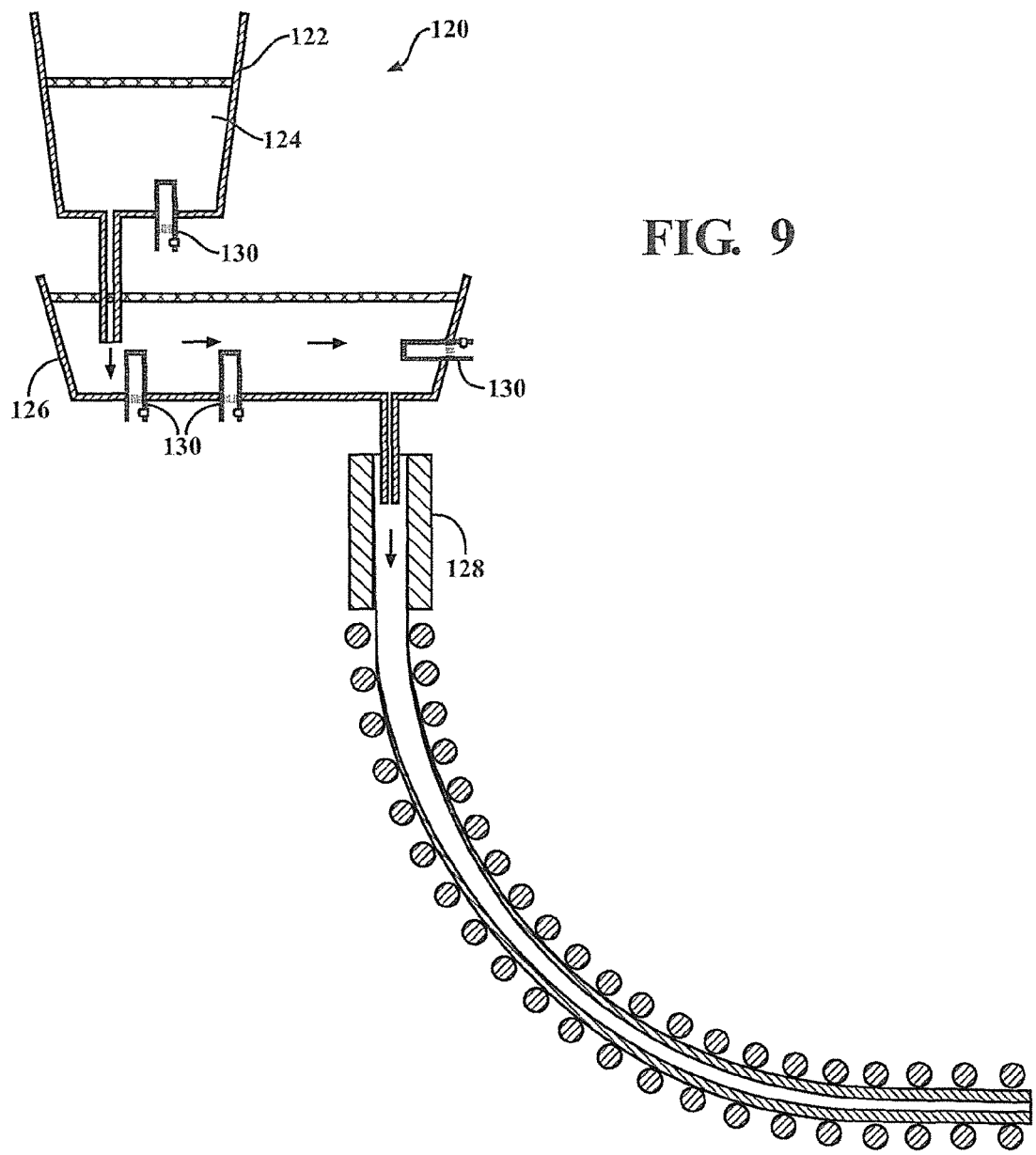
FIG. 9 is a schematic of a portion of a metal processing system including thermoacoustic devices in accordance with another embodiment of the present invention.

FIG. 9 provides a schematic of a portion of a metal processing system 120 including thermoacoustic devices in accordance with a further embodiment of the present invention. The illustrated system represents a continuous casting process, though the present invention may be part of other metal processing systems, or other high temperature processes.

FIG. 9 illustrates a ladle 122 filled with liquefied metal 124. The metal flows into a tundish 126 and then into a mold 128. A plurality of thermoacoustic devices 130 are provided in various locations, for monitoring the temperatures in these locations. Each thermoacoustic device may be as described in FIG. 6 or may take other forms.

Referring back to FIG. 1, the nuclear power system 10 also may be considered a system for high temperature materials. In this case, the high temperature material is the nuclear fuel and the thermoacoustic devices are disposed inside the vessel 14.

Figure 10:
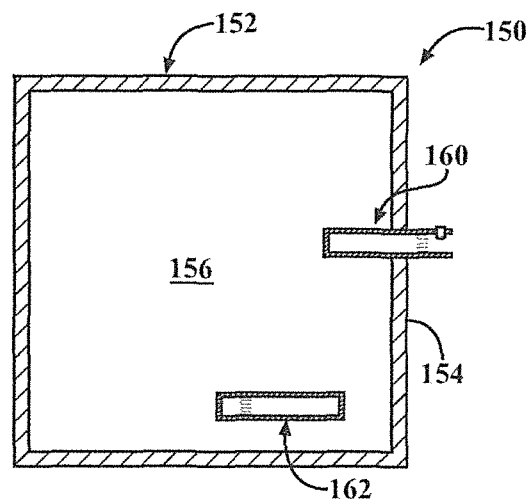
FIG. 10 is a diagram of a generic high temperature process with a thermoacoustic monitoring device, in accordance with yet another embodiment of the present invention.

FIG. 10 provides a diagram of a generic high temperature process or system 150 having a high temperature container 152 with a containment wall 154. The container may be open or closed. A high temperature material 156 may be disposed in the container 152. A thermoacoustic device is shown at 160 and another at 162. The devices 160 and 162 are at least partially disposed in the container so as to be in thermal communication with the process or material 156 therein. The device 160 penetrates the containment wall 154 so that the high temperature end is in thermal communication with the material 156 and the low temperature end is in thermal communication with the environment outside of the container. The device 162 is entirely disposed in the container 152. In this version, the two ends must have different temperature environments in order to have a sufficient temperature differential in the interior chamber. In the nuclear example discussed above, the high temperature end has a nuclear heat source, though other approaches may be used to create a sufficient temperature differential. For example, a process my have different temperature zones within a common container, and the two ends may be in different zones. Alternatively, one or more heat exchangers may be used to exhaust heat from the cold end of a stack or the low temperature end of the housing.

The diagram of FIG. 10 may represent the nuclear system or metal or glass melt systems discussed above, as well as other high temperature processes or systems. Additional examples include chemical processes such as cracking and gasification.

We turn now to a more detailed explanation of some of the science behind certain embodiments of the present invention, with particular emphasis on the versions for use with nuclear systems, having a portion of nuclear fuel in the thermoacoustic device or engine. Simple explanations of the operation of thermoacoustic standing-wave heat engines are readily available. This section will focus on the aspects of the fuel-rod thermoacoustic engine that are new and particular to this implementation.

At the most basic level, there are two significant differences between a fuel-rod engine such as shown schematically in FIG. 3 and a generic standing-wave thermoacoustic engine. Both engines have a "stack" where the thermoacoustic effect converts heat flow into sound production. The difference is that the fuel-rod engine lacks both a hot and ambient-temperature (exhaust) heat exchanger. The lack of a physical hot heat exchanger structure in the fuel-rod thermoacoustic engine is possible due to the high temperatures produced by the fuel or other heat source generated by another industrial process. The transfer of heat from the fuel pellets to the hot end of the stack can be accomplished efficiently by electromagnetic (thermal) radiation. At the simplest level, radiative heat transfer from the fuel pellets to the hot end of the stack is governed by the Stefan-Boltzmann Law:

$$E_b = \sigma T^4 \quad (1)$$

The total radiant energy emitted by a "black body", $E_b$, is proportional to the fourth-power of the absolute (Kelvin) temperature T of the radiating surface where $\sigma \equiv [\pi^2 k_B^4/60h^3c^2] = 5.67 \times 10^{-8}$ W/m$^2$-°K$^4$.

The actual expression for the heat transfer is more complicated than Eq. (1), since it involves the area of both the hot end of the stack $A_{st}$ and its absolute temperature $T_{st}$, as well as the effective radiating area $A_{hot}$ of the heat source (e.g., fuel pellet) and its temperature $T_{hot}$. It is also necessary to introduce the electromagnetic emissivities $\epsilon_{st}$ of the hot end of the stack, the heat source, and the hot end of the resonator, to account for the deviation in the radiative properties of the hot surfaces from the ideal black-body behavior (i.e., complete emission and absorption at all wavelengths). The net rate of heat transfer to the hot end of the stack $Q_{hot}$ is determined by the difference in the stack hot-end temperature, $T_{st}$, which determines the steady-state re-radiation of heat back to the heat source, and the temperature of the heat source, $T_{hot}$.

$$Q_{hot} = \sigma[\epsilon_{hot} A_{hot} T_{hot}^4 - \epsilon_{st} A_{st} T_{st}^4] \quad (2)$$

Again, Eq. (2) is a simplification that creates an effective hot surface emissivity $\epsilon_{hot}$, which averages over the various surfaces and their conditions (e.g., polished, oxidized, rough, etc.) and the range of electromagnetic wavelengths, and an effective hot radiating area $A_{hot}$. That effective area averages over all propagation angles of the electromagnetic radiation. Similar approximations have been made to characterize the effective emissivity of the stack's hot end $\epsilon_{st}$, and the area $A_{st}$, which is related to the cross-sectional area of the stack.

The significant result of the simplified expression for the heat transfer rate $Q_{hot}$ in Eq. (2) is that the heat transfer from the fuel to the hot end of the stack is proportional to the absolute temperatures raised to the fourth power. At the high temperatures created by the radioactive decay of the fuel pellets, electromagnetic radiative heat transfer is a very efficient way to heat the hot-end of the stack. For that reason, no separate hot heat exchanger is required, unlike a typical system described by Swift in 1992.

To validate the operation and effectiveness of the present invention, an experimental prototype of a thermoacoustic device was constructed. A high temperature end of the thermoacoustic device was heated with a heating element, to simulate the heat that would otherwise be provided by the nuclear heat source. The stack was a Celcor (an extruded cordierite ceramic product produced by Corning Environmental Technologies) ceramic stack with 1,100 cells/in$^2$, and was indirectly heated by the heating element. The resonator contained air at a mean pressure $p_m$=125 kPa. The air temperature at the ambient end of the resonator was controlled by a water bath surrounding the resonator and remained at 24° C. throughout an experimental run. Once a sufficient temperature differential was established across the stack, there was an onset of thermoacoustic oscillations. After onset, the temperature difference became fairly stable at $\Delta T$=326±14° C. The average frequency of the thermoacoustically-generated standing wave was f=885±9 Hz.

Another feature of the fuel-rod thermoacoustic engine is the absence of an ambient-temperature heat exchanger, such as a water-cooled version that may be used in a typical thermoacoustic engine described by Swift in 1992. The purpose of the ambient-temperature (cold) heat exchanger is to exhaust waste heat from the end of the stack so that the temperature gradient across the stack is maintained. Maintenance of that temperature gradient across the stack is required for the conversion of heat to sound produced by the thermoacoustic processes within the stack.

The fuel-rod thermoacoustic resonator is able to eliminate the ambient-temperature heat exchanger because the high-amplitude acoustic standing wave generates a streaming flow of gas. The pattern of this acoustically-induced steady flow is a collection of streaming cells that drives gas flow in one direction near the center of the resonator's axis and in the opposite direction along the walls of the resonator. This is illustrated by the arrows 76 in FIG. 3. The acoustically-generated streaming flow carries heat away from the ambient-temperature end of the stack and transports the gas along the resonator wall to efficiently transfer the heat to the wall that is in excellent thermal contact with the surrounding heat conduction fluid, usually water. Acoustical streaming also takes place within the pores of the stack. Although this streaming has a small influence on the temperature distribution along the stack, it is not important in this context.

This acoustically-induced streaming in a Kundt's tube that supported a standing-wave was first observed and reported by Dvořák in 1876. It was explained by J. W. Strutt (Lord Rayleigh) in 1883.

The time-averaged, second-order steady flow in the axial direction $\langle u_2 \rangle$ and in the transverse (radial) direction $\langle v_2 \rangle$ were calculated by Rayleigh from the amplitude of the first-order acoustical velocity u1 for a standing wave of wavelength $\lambda$ in a gas with sound speed c, where x is the position along the axis of the resonator and r is the radial distance from the axis in a toroidal streaming cell of length L.

$$\langle u_2 \rangle = \frac{3}{8}\frac{u_1^2}{c}\left(1 - \frac{2r^2}{R^2}\right)\sin\left(\frac{\pi x}{L}\right) \quad (3)$$

$$\langle v_2 \rangle = \frac{3}{8}\frac{u_1^2}{c}\frac{2\pi r}{\lambda}\left(1 - \frac{r^2}{R^2}\right)\cos\left(\frac{\pi x}{L}\right) \quad (4)$$

Rayleigh's theory was extended by Nikolas Rott to include (i) the acoustic temperature fluctuations $T_1$ caused by the acoustic pressure, $p_1$, $(T_1/T_m)=[(\gamma-1)/\gamma](p_1/p_m)$; (ii) the thermal boundary layer with thickness $\delta_\kappa=(2\kappa/\rho c_P \omega)^{1/2}$, where $\kappa$ is the thermal conductivity of the gas, $\rho$ is the gas density, cP is the gas specific heat at constant pressure, the polytropic coefficient $\gamma=c_P/c_V$, and $\omega=2\pi f$; (iii) the variation of mean temperature Tm with respect to the axial coordinate x; and (iv) the dependence of viscosity $\mu$ and thermal conductivity $\kappa$ on temperature, assuming the form for the viscosity of $\mu(T) \propto T^\beta$, where $\beta$ is a constant (typically about 0.7) that depends on the properties of the fluid. These considerations modify the axial component of the time-averaged streaming velocity from the Rayleigh result of Eq. (3).

$$\langle u_2 \rangle = (1+\alpha_1)\frac{3}{8}\frac{u_1^2}{c}\left(1 - \frac{2r^2}{R^2}\right)\sin\left(\frac{\pi x}{L}\right) \quad (5)$$

$$\alpha_1 = \frac{2}{3}(1-\beta)(1-\gamma)\frac{\sqrt{P_r}}{1+P_r} \quad (6)$$

The Prandtl number, $Pr=\mu c_P/\kappa=(\delta_v/\delta_\kappa)^2$, is the dimensionless ratio of the fluid's ability to transmit viscous shear to its ability to transfer heat by thermal conduction (e.g., for molasses Pr is very large and for mercury Pr is very small).

Thompson and Atchley used laser Doppler anemometry to measure the time-averaged acoustically-driven streaming flow outside the viscous boundary layer as a function of a dimensionless parameter that they designated as the nonlinear Reynolds number, Re.

$$R_e = 2\left(\frac{u_1}{c}\right)^2\left(\frac{R}{\delta_v}\right)^2 \quad (7)$$

They identified two cases corresponding to slow streaming ($R_e \ll 1$) that is described by Rott in Eqs. (5) and (6) and others and "nonlinear streaming" characterized by $R_e > \sim 1$.

A relevant result for heat transfer enhancement by thermoacoustically-driven streaming in the fuel-rod thermoacoustic engine can be deduced. The classical theory for the time-averaged streaming velocity works quite well up to relatively high amplitudes, but even where the classical theory breaks down, the velocity profile near the resonator's walls is still well-represented by the classical results of Eq. (5). Since it is the streaming velocity near the resonator's walls that controls the heat transfer (i.e., the Nusselt number) from the gas to the heat transfer fluid surrounding the resonator, the classical theory should be adequate for sound pressure levels expected to be generated thermoacoustically within the fuel-rod resonator.

If one measures the normalized time-averaged axial streaming velocity $\langle u_2 \rangle/M^2 c_o = \langle u_2 \rangle c_o/u_1^2$ as a function of radial position in the tube using laser Doppler anemometry in a tube with radius R=23 mm at f=310 Hz, in air with the thermodynamic sound speed co, the profile is generally parabolic. At this amplitude, Re=5.7, the classical theory of Eqs. (5) and (6) provides an accurate description of the parabolic flow profile. For this measurement, the peak acoustic $p_1 = \rho c_o u_1 = 900$ Pa, hence $p_1/p_m = 0.9\%$.

The normalized time-averaged axial streaming velocity $\langle u_2 \rangle/M^2 c_o = \langle u_2 \rangle c_o/u_1^2$ as a function of radial position in a tube measured using laser Doppler anemometry at f=310 Hz, in air with the thermodynamic sound speed co has a profile that is less parabolic. At this amplitude, $R_e=19$, there is substantial deviation from the classical theory of Eqs. (5) and (6). Although this deviation is substantial near the tube's axis, the behavior of the velocity in the region closest to the resonator's walls, $r/R \lesssim \pm 1$, the flow field is rather close to the classical prediction. For this measurement, the peak acoustic $p_1 = ?\rho c_o u_1 = 1.64$ kPa, hence $p_1/p_m = 1.7\%$.

The measured root-mean-square acoustic pressures ranged from 400 to 750 $Pa_{rms}$ so the range of peak acoustic pressure is 1.1 kPa$>p_1>$570 Pa, corresponding to 1.1%$>p_1/p_m>$0.6%, which is within the range of measurements for streaming velocity discussed above.

Heat can be transferred from higher temperatures to lower temperatures by three mechanisms: conduction, convection, or radiation. Radiation has already been treated in the discussion of the transfer of heat from the fuel pellets to the hot-end of the thermoacoustic stack. In general, heat transfer by convection of a moving fluid is always more efficient than by conduction by the same stagnant fluid.

The influence of sound on heat transfer is a problem that has generated considerable experimental and theoretical interest. An early estimate of acoustical effects that enhance heat transfer was made by Westervelt in 1960. His treatment was based on earlier experiments for acoustical flow around a cylinder. Mozurkewich studied the effect of sound on heat transfer specifically related to thermoacoustics, but also focused on cylindrical objects in the sound field. All of these investigations, as well as others, attribute enhanced heat transfer to the presence of streaming.

Westervelt proposed a critical Reynolds number $R_c$ for the onset of acoustically-enhanced heat transfer arguing that when the acoustical particle displacement $x_1 = v_1/\omega$ exceeded the thickness of the viscous boundary layer $\delta_v = (2\mu/\rho\omega)^{1/2} = (2v/\omega)^{1/2}$, then streaming brings fresh fluid to the heat transfer surface and sweeps away the previous fluid parcel, along with the heat it had collected.

$$R_c = \frac{v_1^2}{\omega \nu} = \left(\frac{x_1}{\delta_\nu}\right)^2 \tag{8}$$

It is expected that the presence of a standing wave will enhance heat transfer because (i) the sound wave will cause the gas in the acoustically-driven resonator to exhibit steady flow (streaming) and because (ii) the heat that drives the thermoacoustic resonance will be transported along the "stack" and part of that heat will be converted to (acoustic) work. That work will also be dissipated at the resonator walls due to thermoviscous losses and will be transmitted out of the resonator through the resonator walls that are presumed to be in thermal contact with a surrounding pool of water.

Preliminary measurements were made with an earlier thermoacoustic engine prototype known as the "Submersible Thermoacoustic Resonator" (Submersible). Those measurements indicated that the heat transfer from the inside of the resonator to the surrounding water was enhanced by the presence of the thermoacoustically-generated standing wave. Subsequently, more careful measurements were made that allowed the standing wave sound field to be suppressed without changing any other experimental parameters and was thus able to quantify both thermoacoustically-mediated heat transfer enhancement mechanisms (i.e., increased heat transfer through the stack and increased heat transfer from the gas to the resonator walls and into the surrounding heat transfer fluid).

The speed of sound c in an ideal gas is a function of the gas properties and the absolute (Kelvin) temperature.

$$c = \sqrt{\frac{\gamma \Re T}{M}} \tag{9}$$

The polytropic coefficient, $\gamma = c_P/c_V$, and the mean molecular mass, M, depend upon the gas. For a binary gas mixture with species of molecular mass $M_1$ and concentration $x_1$ and mass $M_2$, with concentration $x_2 = (1-x_1)$, the mean molecular mass is $M = x_1 M_1 + (1-x_1) M_2$.

In a standing-wave resonator that does not have a uniform temperature, like the fuel-rod resonator (e.g., hot gas near the fuel behind the stack but close to ambient temperature gas ahead of the stack), then the effective sound speed, $c_{eff}$, defined in terms of the frequency $f_1$ for the fundamental (i.e., approximately one-half wavelength within the full length of the resonator, L) depends upon the temperature distribution.

$$c_{eff} = 2Lf_1 \tag{10}$$

Substitution of Eq. (10) into Eq. (9) suggests that the frequency of the sound generated by the thermoacoustic engine divided by the square-root of the absolute temperature T should be an invariant since the dimensions of the resonator do not depend on temperature: $f_1/\sqrt{T}$=constant. Experimental data demonstrated that $f_1/\sqrt{T}$ remains constant when T is based on the absolute gas temperature on the ambient-temperature side of the resonator.

It is easier to understand the relationship between sound speed, frequency, and temperature if the standing-wave resonator is conceptualized as consisting of three sections: two gas springs representing the gas trapped at the ends against the rigid ends and an inertial "gas mass" in the center section that is experiencing simple-harmonic-motion that is restored by the stiffness of the two gas springs at the ends.

The effective stiffness of the gas spring is related to the inverse of the compliance C of the gas in the two end portions.

$$C = \frac{V}{\gamma p_m} \tag{11}$$

In Eq. (11), V is the volume each of the two sections of the resonator acting as the gas springs. In this approximation V=AL/3, where L is the overall length of the resonator and A is the resonator's cross-sectional area, presumed in this case to be independent of position. $\gamma p_m$ is the product of the ratio of specific heats (i.e., the polytropic coefficient of the gas) times the mean gas pressure.

An equivalent circuit approximation to a standing-wave resonator consists of two "gas springs" represented by the two capacitors and a "gas mass" represented by the inductor between the springs. In this approximation, the acoustic pressure amplitudes in the springs are constants of opposite sign represented by $Re[p_1]$, where $Re[\ ]$ indicates the real value of a complex quantity. The gas volume-velocity amplitude is constant and −90° out-of-phase and decreases linearly to zero as it must when the gas approaches the rigid ends of the resonator.

The effective inertance L of the gas mass in the center of the model can be expressed in terms of the length of the "gas mass"0 section $\Delta x = L/3$ in this approximation and the cross-sectional area of the resonator, A.

$$L = \frac{\rho_m \Delta x}{A} \tag{12}$$

If one recognizes that the stiffness ($k \propto C^{-1}$) of the two equivalent gas springs depends only upon the mean pressure pm of the gas in the resonator and the equivalent mass (m∝L) is proportional to the density of the gas ?$\rho_m$, but only in the center section. Since the pressure $p_m$ is constant throughout the resonator, the resonance frequency $f_1 \propto (k/m)^{1/2}$, will depend upon the gas density in the center section, hence the temperature in the center.

Although a lumped-element approximation is not precise, it is possible to use computer modeling software to calculate the resonance frequency precisely, since the software actually integrates the wave equation throughout the entire thermoacoustic resonator. Such a computer model was applied to a fuel-rod thermoacoustic sensor (engine) and it allowed the calculation of the entire behavior of the resonator, including the resonance frequency and the temperatures in all segments of the resonator.

Based on the results of this model, the sound speed in the hot end of the resonator is c(780° K)=560 m/sec. In the ambient-temperature duct, the sound speed is c(340° K)=370 m/sec. The model calculates the effective length L of the resonator by calculating the entire gas-filled volume of the resonator and dividing by the cross-sectional area of the resonator $A = 2.4 \times 10^{-4} m^2$ to produce L=0.195 m. Based on the resonance frequency $f_1$=965 Hz and Eq. (10), the effective sound speed $c_{eff}$=377 m/sec.

As claimed in the approximate lumped-element model, the frequency of the resonance $f_1$ is indicative of an effective sound speed of 377 m/sec which is much closer to the sound speed in the ambient duct (370 m/sec) than that in the hot end of the resonator (560 m/sec).

In addition to the frequency of the thermoacoustically-generated standing wave, there is also information about the fuel-rod that can be inferred from changes in amplitude of the radiated sound. The fuel pellets in a fuel-rod are known to degrade over time in a way that produces cracks. Those cracks can have two effects on the standing wave: Since the cracks provide additional volume for the gas, the effective length of the resonator increases and the resonance frequency decreases. In addition, the cracks provide additional dissipative surface area that reduces the amplitude of the sound. By observation of those two changing characteristics of the sound radiated by the thermoacoustic fuel-rod resonator, it might be possible to track the degradation of the fuel pellets over time.

Also, it might be possible to excite more than one resonance in a thermoacoustic fuel-rod resonator. Because different modes have different pressure and velocity distributions within the resonator, it might be possible to use the multiplicity of sound frequencies and amplitudes to detect other properties of the gas within the fuel-rod resonator, such as the concentration of radioactive decay products (e.g., krypton or xenon gas).

Finally, combinations of resonators, in good thermal contact with each other, could produce different frequencies but one of the resonators would not have any fuel pellets included. The difference in the frequencies of two such resonators could simultaneously provide information about the temperature of both and the presence of decay products in the resonator that contains the fuel pellets.

Certain embodiments of the present invention require only the simple addition of a single component (i.e., a thermoacoustic stack) to a nuclear fuel-rod. Unlike other thermoacoustic engines, this embodiment does not require either a hot heat exchanger to deliver heat to the stack or an ambient-temperature heat exchanger to remove the exhaust heat from the stack. Due to the high temperatures produced by the nuclear fuel pellets within the fuel-rod thermoacoustic engine, electromagnetic (thermal) radiation can transport the required heat to the hot end of the stack. The thermoacoustically-induced standing wave that is produced is of sufficient amplitude (see Eqs. (7) and (8)) to create streaming of the gas which efficiently removes the exhaust heat from the ambient-temperature end of the stack and delivers it convectively to the walls of the resonator and thereby to the surrounding heat transfer medium, typically water in a pressurized water reactor or a spent fuel pond. This streaming flow is an acoustic gas circulation pump that requires no moving parts or auxiliary plumbing.

As discussed herein, the acoustically-pumped gas circulation significantly enhances the heat transfer efficiency of the fuel-rod resonator over the heat transfer rate of an identical structure that does not support an acoustic standing wave.

Since the sound wave can radiate from the fuel-rod resonator to the surrounding fluid, it is possible to detect the amplitude and frequency of the standing sound wave within the fuel-rod resonator remotely without the necessity of providing electrical power either for sensing or for telemetry. As shown, both theoretically and experimentally, knowledge of the frequency of the standing-wave resonance is indicative of the temperature of the fuel-rod and the surrounding heat transfer fluid.

There are other parameters of fuel-rod performance and fuel pellet degradation that may be sensed remotely by a thermoacoustic oscillation in a nuclear fuel-rod. Such additional information might involve monitoring of the amplitude, as well as frequency, of the fundamental resonance mode or simultaneous excitation of more than one standing-wave resonance mode in a single resonator. Further information might be remotely accessible by combinations of multiple fuel-rod resonators.

Figure 11:
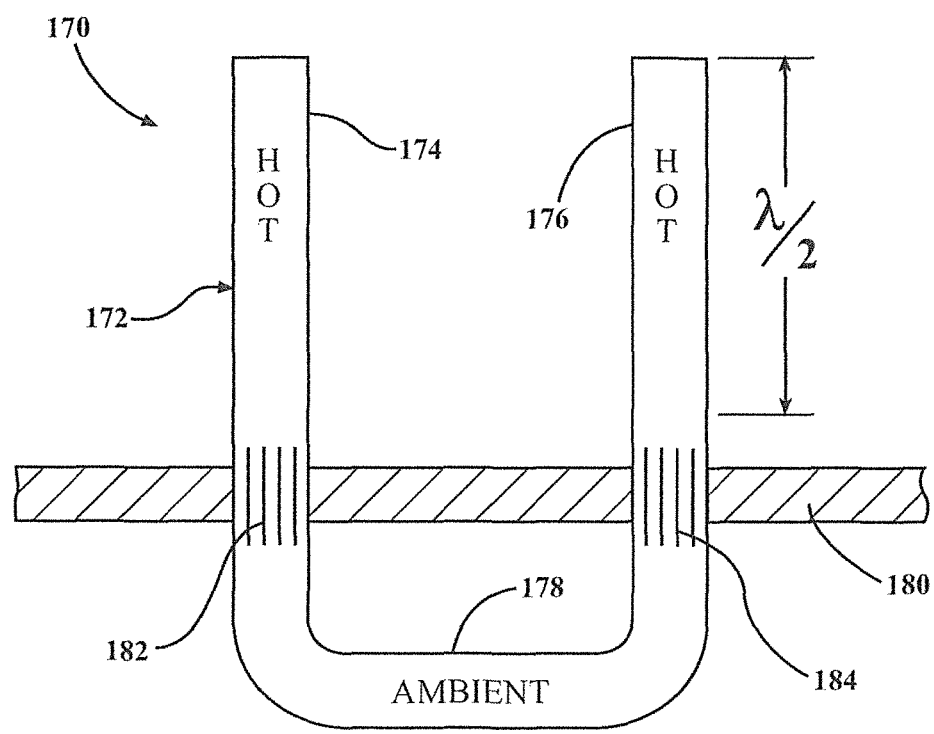
FIG. 11 is a cross-sectional schematic of yet a further alternative thermoacoustic device for use with the present invention.

Referring now to FIG. 11, a further alternative embodiment of a thermoacoustic device is shown generally at 170. This device 170 may be described as U-shaped, having a housing 172 with two end portions 174 and 176 joined by a connection portion 178. This embodiment acts like two interconnected thermoacoustic devices. In the illustrated version, the two end portions 174 are disposed in thermal communication with a hot material, such as by penetrating the containment wall 180 of the crucible. These end portions each become high temperature ends of the housing and the connecting portion 178 is the corresponding low temperature portion of both thermoacoustic devices. In a version with a stack, stacks 182 and 184 are disposed in the housing 172 between the connecting portion 178 and each end portion 174 and 176. Each stack has a hot end directed toward the high temperature end of the housing and a cold end directed toward the connecting portion. In the illustrated embodiment, the end portions 174 and 176 are each approximately a half wavelength long. A microphone or other sensor, not shown, may be added to the housing, inside or out to pick up the acoustic waves. It is preferred that such a sensor not be positioned at the midpoint of the connection portion 178, since this would be a pressure node.

While the device 170 is illustrated as a symmetrical U-shaped housing, other shapes are possible, and the device may be non-symmetrical. For example, one end portion may be a different length than the other. As a further alternative, the orientation of the thermoacoustic device may be flipped such that the connecting portion is the high temperature "end" and the two end portions are outside the credible and are the low temperature ends. The positions of the stacks, if present, would need to be adjusted, as will be clear to those of skill in the art As will be clear to those of skill in the art, the herein described embodiments of the present invention may be altered in various ways without departing from the scope or teaching of the present invention. It is the following claims, including all equivalents, that define the scope of the present invention.

The invention claimed is:

1. A nuclear thermoacoustic device for remotely monitoring a fuel assembly in a nuclear reactor, comprising:
 a housing defining an interior chamber;
 a nuclear heat source comprising a portion of nuclear fuel disposed in the interior chamber of the housing;
 a stack having a hot end and a cold end, the stack disposed in a mid portion of the interior chamber of the housing with the hot end directed toward the nuclear heat source; and
 a volume of gas or gas mixture disposed in the interior chamber;
 wherein the stack is configured to receive heat energy directly from the nuclear heat source, to convert the received heat energy into an acoustic standing wave within the volume of gas or gas mixture in the interior chamber, and to provide a frequency of the acoustic standing wave corresponding to an effective temperature of gas or gas mixture in the interior chamber such that the effective temperature of the volume of gas or gas mixture in the interior chamber is capable of being monitored remotely from outside the interior chamber by measuring the frequency of the acoustic energy radiated from the housing caused by the acoustic standing wave.

2. A device in accordance with claim 1, wherein: the stack is a ceramic element having an array of parallel channels.

3. A device in accordance with claim 1, wherein: the thermoacoustic device lacks heat exchangers.

4. A device in accordance with claim 1, wherein the stack is further configured to provide an amplitude of the acoustic standing wave for monitoring information related to the volume of gas or gas mixture in the interior chamber.

5. A device in accordance with claim 1, wherein the hot end of the stack is spaced from the nuclear heat source.

6. A device in accordance with claim 1, wherein the nuclear heat source is in one end of the interior chamber.

\* \* \* \* \*